United States Patent [19]

Young et al.

[11] 4,398,564
[45] Aug. 16, 1983

[54] SEALED LAY-IN WIREWAY

[75] Inventors: Steven J. Young, Oakdale; Gary K. Semmel, Anoka; Terry L. Munich, Princeton, all of Minn.

[73] Assignee: Federal Cartridge Corporation, Minneapolis, Minn.

[21] Appl. No.: 303,828

[22] Filed: Sep. 31, 1981

[51] Int. Cl.³ .................... H02G 3/04; H02G 3/06
[52] U.S. Cl. .............................. 138/92; 138/155; 138/163; 138/164; 174/68 C; 174/101; 220/244; 285/121
[58] Field of Search ............... 285/121, 129; 220/244, 220/243, 251; 174/356 C, 68 C, 101; 138/92, 155, 163, 164

[56] References Cited

U.S. PATENT DOCUMENTS

| | | | |
|---|---|---|---|
| 758,714 | 3/1904 | Krantz | 15/50 |
| 1,473,290 | 11/1923 | Hammer | 220/337 |
| 1,799,876 | 4/1931 | Travis | 220/243 |
| 1,813,331 | 7/1931 | Wadsworth | 361/356 |
| 1,986,965 | 1/1935 | Frank | 174/72 C |
| 1,992,574 | 2/1935 | Jenkins | 174/72 C |
| 2,023,433 | 12/1935 | McConnell | 174/50 |
| 2,332,017 | 10/1943 | Sedgwick | 220/31 |
| 2,353,121 | 7/1944 | Adam | 285/404 |
| 2,445,198 | 7/1948 | Wiesmann | 174/99 R |
| 2,714,424 | 8/1955 | Atkinson | 166/173 |
| 2,905,201 | 9/1959 | McNaughton | 285/419 |
| 2,917,083 | 12/1959 | Duvall et al. | 285/121 |
| 2,921,607 | 1/1960 | Caveney | 138/106 |
| 2,956,587 | 10/1960 | Fisher | 285/407 |
| 3,003,794 | 10/1961 | Burley | 285/121 |
| 3,003,797 | 10/1961 | Gage | 277/117 |
| 3,070,689 | 12/1962 | McIntosh | 362/362 |
| 3,243,503 | 3/1966 | Burley | 138/159 |
| 3,312,251 | 4/1967 | Marks et al. | 138/158 |
| 3,331,916 | 7/1967 | George et al. | 174/68 C |
| 3,338,599 | 8/1967 | Hallman | 285/121 |
| 3,351,699 | 11/1967 | Merckle | 174/35 GC |
| 3,370,121 | 2/1968 | Merckle | 174/35 GC |
| 3,401,721 | 9/1968 | George | 138/92 |
| 3,562,402 | 2/1971 | Dwyer | 174/35 GC |
| 3,570,546 | 3/1971 | Jackson | 138/155 |
| 3,633,628 | 1/1972 | Duquette | 138/116 |
| 3,636,984 | 1/1972 | Rauhauser | 138/155 |
| 3,874,550 | 4/1975 | Gordon | 220/251 |
| 4,040,449 | 8/1977 | Butler et al. | 138/155 |

FOREIGN PATENT DOCUMENTS

| | | | |
|---|---|---|---|
| 205732 | 12/1956 | Australia | |
| 614800 | 2/1961 | Canada | 220/244 |
| 657888 | 2/1963 | Canada | |
| 517209 | 1/1940 | United Kingdom | |
| 549840 | 8/1942 | United Kingdom | |
| 685964 | 1/1953 | United Kingdom | |

Primary Examiner—John W. Shepperd
Attorney, Agent, or Firm—Schroeder, Siegfried, Vidas & Arrett

[57] ABSTRACT

A sealed lay-in wireway comprised of channel members secured together in end-to-end relation with sealing flange gaskets thereinbetween and having longitudinally spaced covers having resilient gaskets extending continuously along their periphery and having a pivotally mounted bridging member extending along their open sides between the adjacent ends of their covers which shiftably mounts a sealing plate thereunder, the sealing plate having gasket material at each of its ends which bears against inwardly extending flanges of the channel members when drawn upwardly by a camming mechanism carried by the bridging member, the upper surface of the sealing plate at the same time bearing against gasket material carried by the ends of the covers to cooperatively perfect a seal at all of the joints.

12 Claims, 9 Drawing Figures

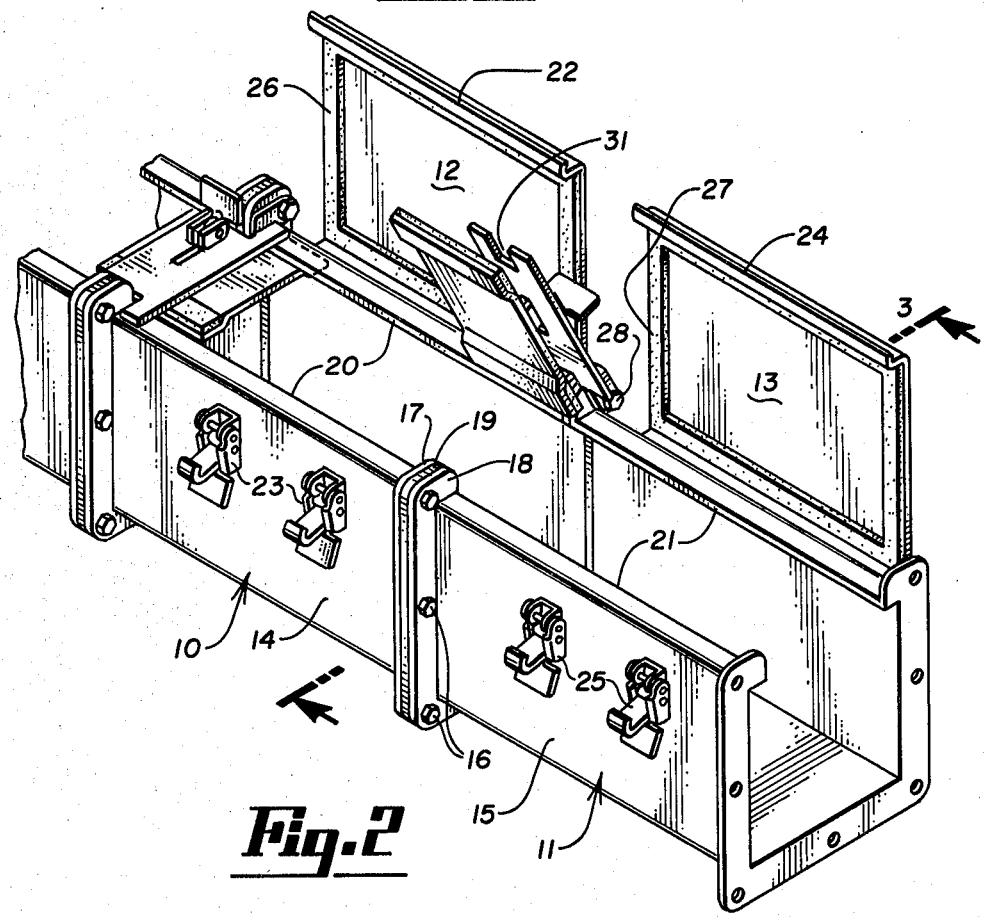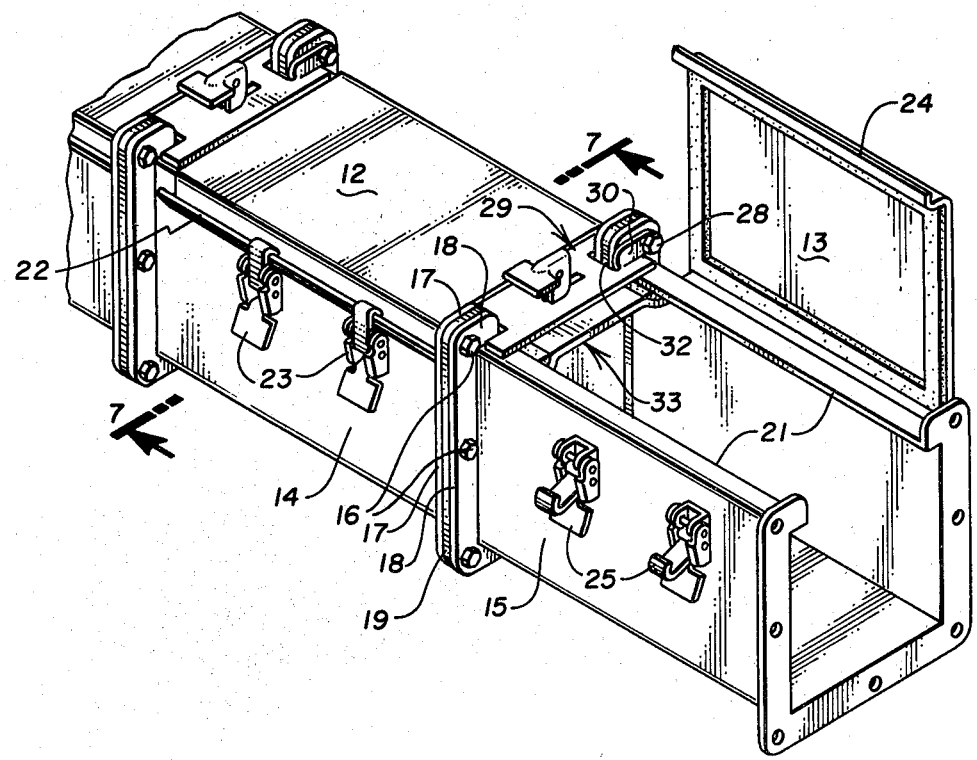

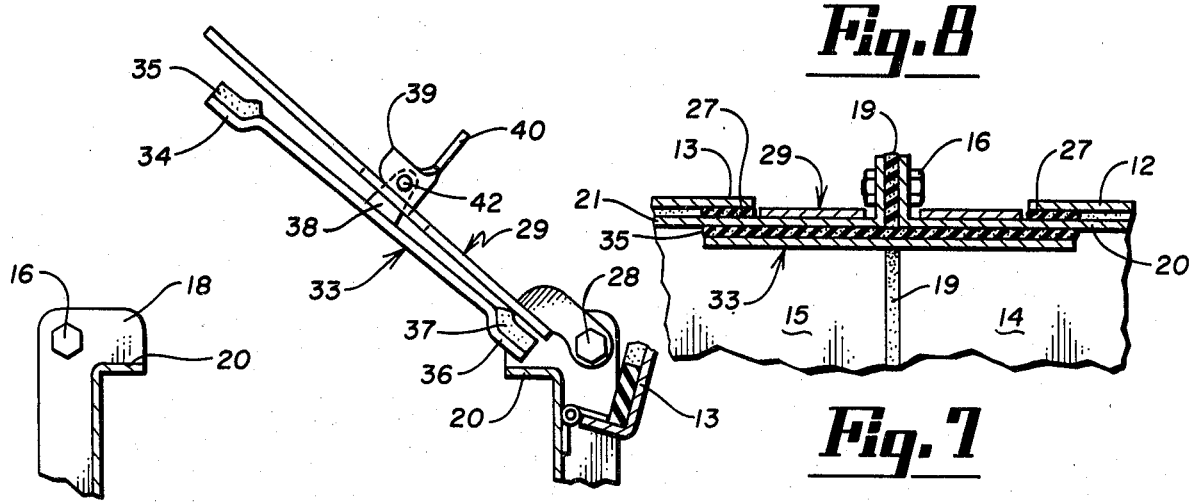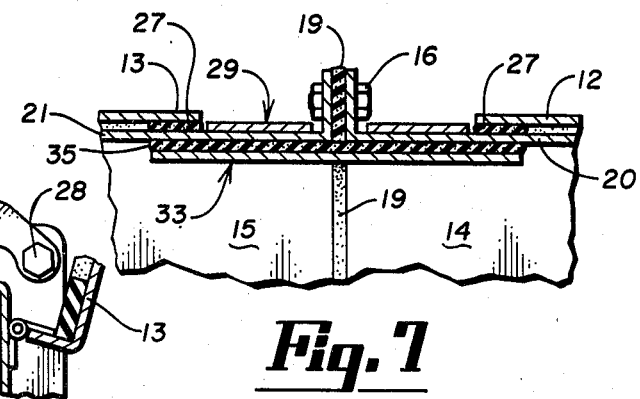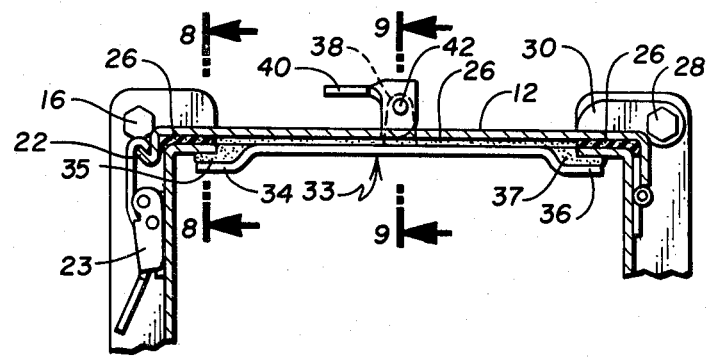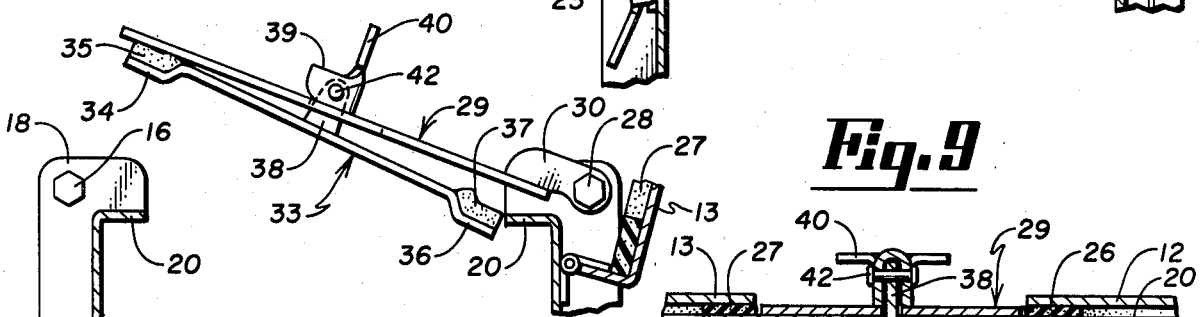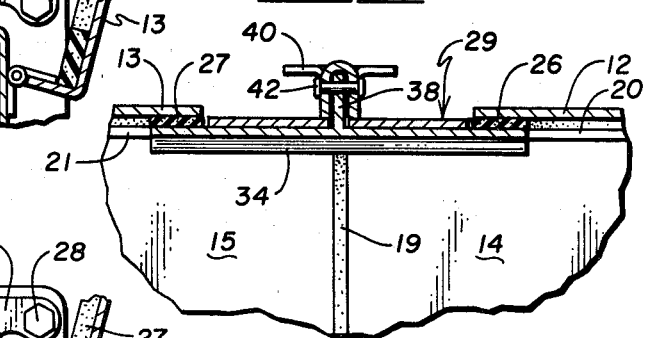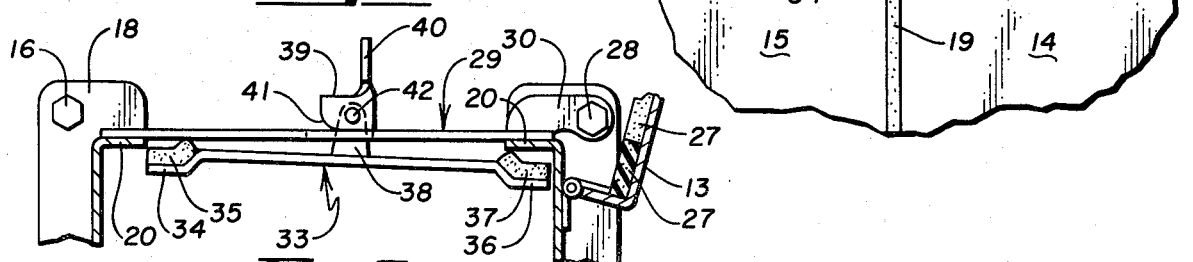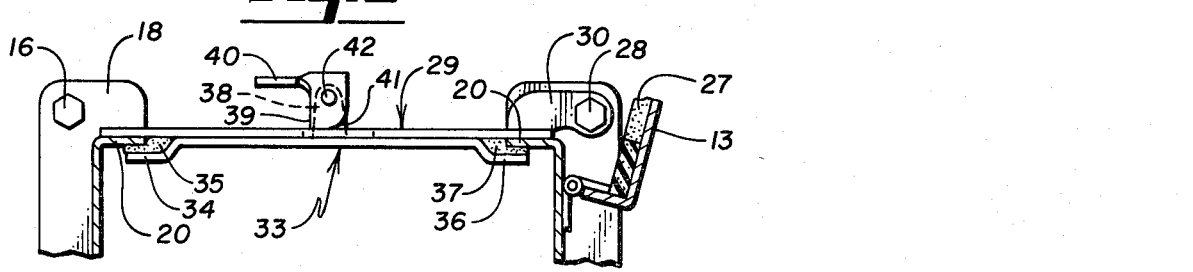

SEALED LAY-IN WIREWAY

DESCRIPTION

1. Background of Prior Art

The need for lay-in wireways which have a fluid-tight seal has increased markedly in recent years because of conditions in various manufacturing plants in which liquids such as lubricants permeate the air in fine mist form and penetrate into the interior of all containers which do not have such fluid-tight seals. Such liquids, particularly lubricants, seriously damage electric wirings within a relatively short period of time and, therefore, it has become imperative that electric wiring in such environments be disposed within such fluid-tight sealed wireways.

The closest prior art of which we are aware is that shown in U.S. Pat. No. 3,636,984 which, although it constituted a definite improvement over the art at the time it issued, has some inadequacies and is constructed and functions in a different manner which leaves something to be desired.

2. Brief Summary of the Invention

The invention comprises a pivotally mounted bridging member on a pair of channel members located between their covers and carrying a mechanically connected sealing plate which is moved upwardly into sealing position so that its gaskets cooperate with the cover gaskets and with sealing flange gaskets to perfect an improved sealed lay-in wireway. Also, the sealing plate gaskets bear against the underside of the opening-defining flanges of the channel members and against the rectangular gaskets of the covers, the latter sealing along the sides of the sealing plates and cooperating with its gaskets at the end to provide an improved seal. The ends of the sealing plate are depressed so that the gaskets of the covers readily engage the upper surface of the side portions of the sealing plate, while the gaskets at the depressed ends of the sealing plate extend upwardly above its intermediate portion so as to bear directly against the gasket material of the cover and the sealing flange gasket. Thus, no leakage is permitted, such as takes place where the gasket material bears against two metal surfaces which are disposed at different levels.

BRIEF DESCRIPTION OF THE DRAWINGS

A detailed description of one preferred embodiment of our invention is hereafter described with specific reference being made to the drawings, in which:

FIG. 1 is a perspective view of a portion of our sealed lay-in wireway with two covers open, one pivotable sealing plate in open position, and the other in position to be shifted into sealable position;

FIG. 2 is a perspective view of the same with one cover being open and the other latched in closed position, both sealing plates being shown in closed sealing position;

FIG. 3 is a fragmentary vertical sectional view, taken along line 3—3 of FIG. 1;

FIG. 4 is a fragmentary sectional view similar to FIG. 3 but showing the sealing plate shifted forwardly to permit closing of the bridging member;

FIG. 5 is a fragmentary sectional view similar to FIG. 3, but showing the sealing plate shifted rearwardly to permit the bridging member to be fully lowered;

FIG. 6 is a fragmentary sectional view similar to FIG. 3, but showing the sealing plate shifted forwardly and locked in sealing position;

FIG. 7 is a fragmentary vertical sectional view taken along line 7—7 of FIG. 2;

FIG. 8 is a fragmentary vertical sectional view taken along line 8—8 of FIG. 7; and FIG. 9 is a fragmentary sectional view taken along line 9—9 of FIG. 7.

DETAILED DESCRIPTION OF THE INVENTION

A section of our new sealed lay-in wireway is shown in FIGS. 1 and 2. As shown, it comprises a plurality of generally U-shaped channel members 10 and 11 which have hinged cover members 12 and 13. The two channel members have adjacent end portions 14 and 15 which are connected together by bolts 16. Each has outwardly extending sealing flanges 17 and 18 which are separated by a gasket 19 of corresponding shape and size. As best shown in FIG. 1, each of the channel members has an open side, the opening of channel 10 being defined by inwardly extending flanges 20 and the opening of channel member 11 being defined by similar flanges 21.

As best shown in FIGS. 1–2, the cover 12 has an outwardly extending lip 22 which is adapted to cooperate with a pair of latch members 23 by means of which the cover can be latched, or locked in closed position. The cover 13 has a similar outwardly extending lip 24 which is adapted to cooperate with a pair of latch members 25 in a similar manner and for the same purpose.

As shown in FIG. 1, the cover member 12 has a continuous rectangular gasket 26 which is located on the underside of the cover member and follows its periphery so as to bear upon the upper surfaces of flanges 20 when moved to a closed position. Cover member 13 has a similar rectangularly arranged gasket 27 applied to its underside and following its periphery so as to bear upon the upper surfaces of the flanges 21 when moved to closed position.

Pivotally mounted by a shoulder bolt 28 or other independent pivot device on sealing flanges 17, 18 is a bridging member 29 which is generally rectangular in shape except that it has an upstanding pivot ear 30, a rectangular notch 31 in one end portion and a rectangular notch 32 in the opposite end portion adjacent its ear. The two rectangular notches in the opposite end portions accommodate the upstanding flanges 17 and 18 of the connected end portions of the two channel members, as best shown in FIG. 2.

Shiftably mounted on the bridging member 29 is a sealing plate 33. This plate 33 is rectangular in shape and is flat except that its end portions 34 and 36 are depressed, as best shown in FIGS. 3–6, inclusive. Its depressed end portion 34 carries a gasket 35 which is secured to its upper surface and extends throughout its length and slightly upwardly above the general plane of the plate 33. The opposite depressed end portion 36 carries a similar gasket 37 which extends throughout its length and slightly upwardly to an elevation slightly above the general plane of the plate 33.

Extending upwardly from the central portion of the sealing plate 33 is an upstanding mounting ear 38. This ear 38 extends upwardly through an elongated slot provided for that purpose through the bridging member 29 and is received within an inverted U-shaped cam 39. This U-shaped cam 39 is provided with a thumb lever 40 and a rounded corner 41 to facilitate its camming action. A pin 42 pivotally mounts the cam 39 upon the ear 38. The camming member 39 is shown in unlocked position in FIGS. 3–5, inclusive, and in camming or locked position, in FIGS. 6–9, inclusive. When in the latter position, the sealing plate 33 is drawn tightly upwardly against the undersurface of the bridging member 29, as best shown in FIG. 6.

In use, the cover members 22 and 24 and the bridging member 29 and attached sealing plate 33 are swung to open position, as shown at the right in FIG. 1. The sealing plate which is shown at the left in FIG. 1 is in a shifted and unlocked position. When the members are in such open position, the electric wiring can be laid within the confines of the channel members 10 and 11, and the corresponding similarly attached channel members with the maximum of ease and convenience.

After the wiring has been laid in such position, the cover members and sealing plate 33 can be swung to closed position. The bridging member and the sealing plate carried thereby are necessarily swung to closed position before the cover members 12 and 13 are closed. To accomplish the closing action, the sealing plate 33 is moved forwardly away from the axis of pivot of the bolt 28, as shown in FIG. 4, so that the sealing plate 33 will clear the inwardly extending flange 20. Just before the bridging member 29 reaches the upstanding flanges 17, 18, the sealing plate 33 is shifted inwardly towards the axis of pivot of the bolt 28 so that its outer end will clear the inwardly extending flanges 20 and 21 at the side of the channel member opposite the axis of pivot, as best shown in FIG. 5. This permits the bridging member 29 to swing to fully closed position, as shown in that figure, and thereafter the sealing plate 33 may be moved forwardly and lever 40 swung to the position shown in FIG. 6, with the result that the sealing plate 33 is cammed upwardly and held tightly against the undersurface of the bridging member 29. As this takes place, the gaskets 35 and 37 are compressed, as shown in FIG. 6, and a seal is perfected between the sealing plate 33 and the flanges 20 and 21, along the entire length of the depressed portions 34 and 36 of the sealing plate while at the same time a seal is perfected with the sealing flange gasket 19.

The cover members 12 and 13 are closed and latched therein by latches 23 and 25, as shown at left in FIG. 2. The outer ends of the gaskets 35 and 37 are drawn upwardly by cam 39 into tight-fitting sealing relation with the lower surface of the rectangular gaskets 26 and 27 and will perfect a seal therewith. If the cover members 12 and 13 are closed after the cam 39 has been moved to locked position, the closing action of the cover members will bring the gaskets 26 and 27 downwardly into sealing relation with the ends of the gaskets 35 and 37 and into sealing relation with the upper surface of the sealing plate 33, along each of its sides. Thus, either way, a perfect seal will be effected at all of the joints between the sealing plate and the cover members, and the sealing plate and the channel members, as well as between the channel members, the cover members and the sealing plate and the flange gasket.

It will be noted that we have eliminated the need for perfecting a seal around the end of a metal plate, as is shown in the Rauhauser U.S. Pat. No. 3,636,984 and thereby have eliminated an imperfect seal at that point. It should also be noted that there is a continuous sealing contact around all openings when seals 35 and 37 bridge the gap between seal 19 and seals 26 and 27. We have found that the sealing function provided by this particular structure is more satisfactory and effective in excluding lubricants, moisture and corrosive dust than those heretofore known. In addition to providing a more effective seal, our wireway has other distinct advantages over other bridging and sealing members, in that it provides a quick, simple and easy release, requires no tools, and cannot become lost.

In considering this invention, it should be remembered that the present disclosure is illustrative only and the scope of the invention should be determined by the appended claims.

We claim:

1. In a lay-in wireway:
   (a) a pair of channel members connected end-to-end and having corresponding open sides through which wiring may be placed within said members;
   (b) covers hingedly connected to said channel members and constructed and arranged to close the open sides of their respective channel members;
   (c) a movably mounted sealing plate pivotally connected with at least one of said channel members and constructed and arranged to extend transversely across the open sides of said channel members at the connected ends thereof; and
   (d) means for sealing the joints between said channel members and said covers, the joints between said channel members and said sealing plate, and the joints between said sealing plate and said covers when the latter are closed;
   (e) said means including said sealing plate and mechanism for moving said sealing plate upwardly into sealing position relative to the underside of said covers when the latter are closed;
   (f) said covers and said sealing plate being constructed and arranged to be moved without dissembly to open position to permit unobstructed placement of wiring in said channel members.

2. The structure defined in claim 1:
   (g) a bridging member pivotally mounted on at least one of said channel members and constructed and arranged to extend transversely across the open sides of said channel members at the connected ends thereof; and
   (h) over dead-center locking mechanism carried by said bridging member and connected to said sealing plate and constructed and arranged to move said sealing plate upwardly into said sealing position.

3. The structure defined in claim 1:
   (g) a bridging member pivotally mounted on at least one of said channel members and constructed and arranged to extend transversely across the open sides of said channel members at the connected ends thereof and to bear upon the upper surfaces thereof; and
   (h) camming means carried by said bridging member and shiftably mounting said sealing plate thereupon, said camming means being constructed and arranged to cam said sealing plate upwardly into sealing relation with respect to the joints between said covers and said sealing plate and the joints between said channel members and said sealing plate.

4. The structure defined in claim 1, and
   (g) camming means connected to said sealing plate and constructed and arranged to draw said sealing plate upwardly into said sealing position;

(h) said sealing plate and at least a portion of said camming means being shiftable transversely of said channel members.

5. The structure defined in claim 1 wherein said sealing plate includes gasket material extending along its end portions at their upper surfaces and parallel to the longitudinal axis of said channel members.

6. The structure defined in claim 1 wherein said sealing plate has depressed end portions extending parallel to the longitudinal axis of said channel members, and includes gasket material extending along the upper surfaces of said depressed end portions.

7. In a lay-in wireway:
(a) a pair of channel members connected end-to-end and having corresponding open sides through which wiring may be placed within said members;
(b) covers hingedly connected to said channel members and constructed and arranged to close the open sides of their respective channel members;
(c) a movably mounted sealing plate pivotally connected with at least one of said channel members and constructed and arranged to extend transversely across the open sides of said channel members at the connected ends thereof; and
(d) means for sealing the joints between said channel members and said covers, the joints between said channel members and said sealing plate, and the joints between said sealing plate and said covers when the latter are closed;
(e) said sealing means including mechanism for moving said sealing plate upwardly into sealing position against portions of said channel members defining the open sides thereof;
(f) said covers and said sealing plate being constructed and arranged to be moved without disassembly to open position to permit unobstructed placement of wiring in said channel members.

8. In a lay-in wireway:
(a) a pair of channel members connected end-to-end and having corresponding open sides through which wiring may be placed within said members;
(b) covers hingedly connected to said channel members and constructed and arranged to close the open sides of their respective channel members;
(c) a movably mounted sealing plate pivotally connected with at least one of said channel members and constructed and arranged to extend transversely across the open sides of said channel members at the connected ends thereof; and
(d) means for sealing the joints between said channel members and said covers, the joints between said channel members and said sealing plate, and the joints between said sealing plate and said covers when the latter are closed;
(e) said sealing means including mechanism for moving said sealing plate upwardly into sealing position relative to portions of said channel members defining the open sides thereof and to the underside of said covers when the latter are closed;
(f) said covers and said sealing plate being constructed and arranged to be without disassembly moved to open position to permit unobstructed placement of wiring in said channel members.

9. The structure defined in claim 7 wherein said sealing plate is longer than the transverse dimensions of the openings of the open sides of said channel members and is shiftable transversely of said channel members.

10. The structure defined in claim 7, and
(g) said mechanism including a bridging member pivotally mounted on at least one of said channel members and constructed and arranged to extend transversely across the open sides of said channel members at the connected ends thereof, each of the end portions of said bridging member being notched to receive the connected ends of said channel member therewithin.

11. The structure defined in claim 7, and
(g) a bridging member pivotally mounted on at least one of said channel members and constructed and arranged to extend transversely across the open sides of said channel members at the connected ends thereof and to bear upon the outer surface thereof; and
(h) camming means carried by said bridging member and shiftably mounting said sealing plate thereupon for limited movement relative thereto, said camming means being constructed and arranged to cam said sealing plate upwardly into sealing relation with respect to the joints between said covers and said sealing plate and the joints between said channel members and said sealing plate;
(i) said sealing plate extending across the openings of said open sides of said channel members when shifted to its limit in a direction away from the axis of pivot of said bridging member, and swinging clear of the sides of said channel members farthest removed from said axis of pivot when shifted to its limit in a direction toward said axis of pivot.

12. In a lay-in wireway:
(a) a pair of channel members connected end-to-end and having corresponding open sides through which wiring may be placed within said members;
(b) covers hingedly connected to said channel members and constructed and arranged to close the open sides of their respective channel members;
(c) a movably mounted mounting plate pivotally connected with at least one of said channel members and constructed and arranged to extend transversely across the open sides of said channel members at the connected ends thereof;
(d) a sealing plate movably mounted on said mounting plate and pivoting therewith and constructed and arranged to extend transversely across the open sides of said channel members at the connected ends thereof when said mounting plate so extends; and
(e) means including said mounting plate and said sealing plate for sealing the joints between said channel members and said covers, the joints between said channel members and said sealing plate and the joints between said sealing plate and said covers when the latter are closed;
(f) said covers and said mounting plate and said sealing plate being constructed and arranged to be moved without disassembly to open position to permit unobstructed placement of wiring in said channel members.

* * * * *